Figure 1:
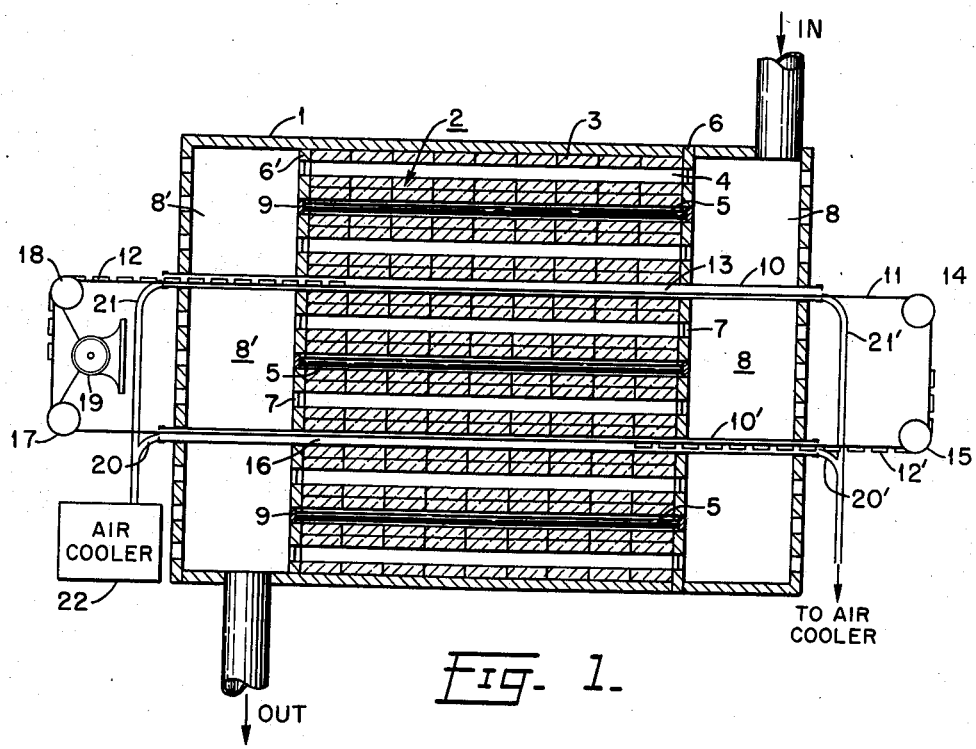

May 10, 1960

J. H. MacNEILL ET AL 2,936,277

REACTOR CONTROL SYSTEM

Filed March 3, 1955

INVENTOR.
John Y. Estabrook
and
John H. MacNeill

BY

ATTORNEY

United States Patent Office 2,936,277
Patented May 10, 1960

2,936,277
REACTOR CONTROL SYSTEM

John H. MacNeill, Melbourne, Fla., and John Y. Estabrook, Oak Ridge, Tenn., assignors to the United States of America as represented by the United States Atomic Energy Commission Application March 3, 1955, Serial No. 492,055

3 Claims. (Cl. 204—193.2)

The present invention relates to a neutronic chain reactor and more especially to an improved method of and apparatus for effective control of the chain reaction occurring within such reactor. The invention especially pertains to mobile reactors where the inertia of the control mechanism is of primary importance and provides an excellent means for reducing the effects of such inertia to a minimum. It possesses great utility for both mobile and fixed reactors in that it provides for a more uniform reactivity change than do the conventional methods of reactor control.

As is now well-known in the art, fissionable material such as uranium of atomic weight 235 and plutonium of atomic weight 239 when bombarded by neutrons will split into two or more nuclei and emit more neutrons. The emitted neutrons may be slowed down in a moderator material until they reach such an energy level that they will be absorbed in another nucleus and cause new fissions. The cycle of neutron moderation, nuclear absorption, nuclear fission, and fast neutron emission constitutes a self-sustaining chain reaction, when fissionable material of sufficient quantity is amassed together. For a more complete description of a neutronic reactor, see U.S. Patent No. 2,708,656, issued May 17, 1955, in the names of Fermi and Szilard, and especially the reactor shown in Fig. 31.

A variety of physical shapes and sizes of neutronic reactors have been built, proposed for operation, or described in the literature. Such reactors are not subject to stresses caused by sudden acceleration or deceleration, such as may be induced in a reactor designed to serve as power plant for an airplane, and generally contain no provision for protecting the necessarily moving control mechanism against such forces.

To overcome certain problems associated with packaging a reactor for mobile use, it has been proposed that the active section or core of the reactor be made up of hexagonal bricks of a moderator such as beryllium oxide, beryllium carbide, or graphite stacked one atop the other to form a rectangular cylinder. Each brick is provided with one or more axial passages, and the passages are axially aligned so as to provide a plurality of continuous cylindrical apertures through the length of the cylinder. Through some or all of the apertures a fuel rod composed of a fissionable material, such as uranium dioxide uniformly distributed in a beryllium carbide matrix, may be disposed. Such a reactor is disclosed in co-pending application of Farrington Daniels, S.N. 713,660, filed December 3, 1946. Or, as an alternative to providing fuel rods, the bricks forming the core itself may comprise a fissionable material uniformly disposed throughout the moderator material matrix. Surrounding the core of either of the above reactors may be a neutron reflector cylinder comprising bricks identical in configuration as those making up the core, but having no fuel material or fuel rods incorporated therein. The reflector may be enclosed in the metallic pressure shell which is provided with headers at either end for ingress and egress of a coolant medium, such as air, which would pass through the channels in the bricks. Fewer coolant passages per brick need be provided in the reflector than in the fuel elements themselves, since the temperature is highest in the active core elements.

Control of the neutron chain reaction in reactors of the type heretofore described has generally been with one or more control rods. These rods contain a good neutron absorber material, and may be inserted and withdrawn through the coolant passages so as to absorb more or less neutrons from the core, thereby allowing the reaction to proceed slower or faster depending upon the rod position in the reactor. Such controls generally require a great deal of space—many stories in altitude—and are generally very heavy. It is readily apparent that the conventional control method, involving as it does acceleration of a large mass of material into a reactor by, for example, an electric motor driving a gear train, would be undesirable for controlling the power plant of an aircraft reactor, due to the excessive inertia of such a large system. Moreover, tremendously large motor drives would have to be provided in order to overcome the acceleration due to gravity which would be imposed on such systems while the plane is in a climbing or diving attitude, if indeed such mechanisms could be utilized at all. Of primary importance, the violent forces acting on single rods during flight accelerations, diving, climbing, and the like could move or break loose the rods, causing the plane to go out of control. Furthermore, it is known that to provide at least a semblance of uniformity in the reactivity change within a reactor volume, it is necessary to provide a multiplicity of control rods, disposed at various locations around the core of the reactor. If then several large motor drive sets were required to actuate the several control rod assemblies, it becomes apparent that the weight and power necessary to operate such systems would be intolerable. A further grave disadvantage of the rod systems of the prior art is that they operate from only one end or face of a reactor, so that while the neutron flux at the control end may be correct, the flux at the other end may be substantially higher, with a resulting dangerous increase in reactor wall temperature.

Yet another important factor in reactor design is the necessity for incorporating great shear strength into the neutron absorber material, for long thin absorber rods suspended only from one end within a reactor lying on its side would of necessity be subjected to very severe stresses during the changes of attitude incident with flight. Yet the rods cannot be made thick enough to support themselves without removing a large amount of fissionable material from the core to make room for the rods, requiring a larger reactor volume, and increasing the uranium requirements considerably. Moreover, the rubbing of a heavy rod on graphite or coated beryllium carbide at the very high reactor temperature is certainly undesirable.

With the knowledge of the serious deficiencies of prior art reactor control systems, applicants have as a primary object of their invention provision of a novel method of reactor control eminently suitable for mobile reactor use.

A further object of their invention is to provide a novel reactor control system having a minimum weight and very low inertia to facilitate rapid control, even under severe acceleration-induced stresses.

Yet another object of their invention is to provide a method of reactor control wherein the reactivity change along the control medium is of improved uniformity.

Another object of their invention is to provide a reactor control system especially suitable for utilization with an airborne reactor power plant.

Figure 2:
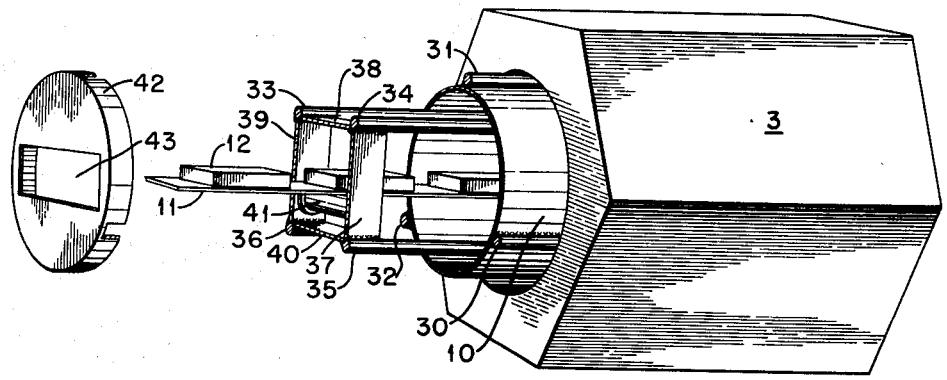

Other objects and advantages of applicants' invention will become apparent from the following detailed description of a preferred embodiment thereof, when read in conjunction with the appended drawings, in which:

Figure 1 illustrates a known type of reactor, comprising a core, reflector, and shell, wherein the core is made of a group of bricks provided with aligned axial passageways for receiving fuel elements, control elements, and a coolant medium, and incorporating our novel control method, and Figure 2 illustrates a mechanism suitable for practicing our invention, including a core brick and tape supporting mechanism.

In accordance with our invention, at least one continuous loop member is moved through the reactor from opposite faces, the member carrying at least one nuclear reactor component of the group comprising fuel material, poison material, or moderator material. Since the loop member forms effectively two balanced, connected, control rods, stresses act equally and oppositely on each half of the loop and are cancelled out.

Referring now to Figure 1, a nuclear reactor may be enclosed in a pressure tight shell 1 which serves to retain the active elements in place, acts as a thermal shield, and retains a cooling gas within the system. The active core 2 comprises a group of hexagonal bricks 3 each provided with an axial passage 4 therethrough and formed from a neutron moderator material, such as beryllium oxide, for example. The bricks may be placed end to end and aligned axially to form continuous passageways through the entire core, which is preferably in form of a rectangular cylinder. Through certain passageways cylindrical fuel rods 5 may be inserted. These rods may be a beryllium oxide matrix having uranium dioxide distributed uniformly therethrough. At opposite ends of the reactor core, end plates 6, 6', having apertures 7, 7' registering with the coolant passages, are provided. Headers 8, 8' form inlet and outlet chambers at opposite ends of a shell 1, which communicates with the inlet and outlet passages for the coolant medium. The bricks are hexagonal, and may be three inches outer diameter, two inches inner diameter and three inches in length, while the fuel rods may be one and one-half inches in diameter, for example. The fuel rods should include uranium enriched in the isotope of atomic weight 235, so that from 20–60 percent of the uranium consists of the 235 isotope. The moderator bricks may comprise beryllium oxide of density 2.7 gm./cc. With 20 percent void space in the core, the height of the core cylinder would be 5.2 feet and the diameter would be 5.6 feet, thus requiring 7160 kilograms of beryllium oxide. If the uranium is enriched to contain 20 percent uranium–235, then 13.8 kilograms of $U^{235}O_2$ would be required for fuel, of which 12.2 kilograms is U–235.

In the reactor wherein the fuel material is distributed uniformly within the moderator brick, a preferred brick configuration is three inches outer diameter and six inches in length. The bricks may preferably be provided with a single central axial passage as in Figure 1, or alternatively with a plurality of smaller, equally-spaced axially parallel passages; for example, nineteen apertures, each 0.4 inch in diameter, may be provided.

The moderator may comprise a mixture of beryllium carbide and graphite in the ratio of three molecules of beryllium carbide to each atom of graphite, the density of such mixture being 2.4 gm./cc. The fissionable material may be uranium 90% enriched in the U–235 isotope distributed uniformly throughout the moderator in the form $UC_2$, with a density of 10.1 gm./cc. The ratio of coolant channel volume to total core volume (free flow ratio) may be 13, with the channels being .125 inch in diameter and coated with .002 inch of molybdenum disilicate of density 6.27 gm./cc.

For a molecular ratio of 1500 (molecules of $Be_2C$ per molecule of $U^{235}$) a reflector thickness of 3 inches, and free flow ratio of .3, a core four feet in diameter and four feet long would require substantially 21.7 lbs. U–235. The outer diameter of the reflector would be 4.5 feet, and the coolant flow area 3.8 sq. ft. The above criticality requirements are based upon an actual hot, poisoned, air-cooled reactor with coated channels, operating after 100 hours of operation at 600,000 kw. power, 2200° F., the air being at substantially the same temperature and at a pressure of 50 atmospheres inside the pressure shell.

It is to be understood that our invention is not limited to use with reactors of this type, but a description is given herein for completeness only. The invention is useful in circulating fuel reactors, flat plate fuel reactors, or any other known type.

Referring again to Figure 1, one embodiment of our invention contemplates a method for reactor control wherein a single endless medium is passed through a first channel through the reactor, around driving means adjacent one face of the reactor, back through a second parallel channel in the reactor, and around a second driving means adjacent the opposite reactor face. All or preferably only two portions of the carrier medium may be coated or have otherwise attached thereto a fixed amount of neutron absorbent material, moderator, or fuel material. For example, a tape 11 may have neutron absorbent material 12, 12' mechanically fixed thereon in two separate portions, and may be adapted to pass through a tube 10, inserted in pile coolant channel 13, over pulleys 14, 15, back through a second tube 10' in coolant channel 16 to the other opposite face of the reactor, and over a second group of pulleys 17, 18. One or more of the pulleys may be coupled to any conventional actuating means, such as electric motor 19. The pulleys are located at such distance from the faces of the reactor that the majority of the neutron-absorbent material may be external of the pile at times to allow operation at full power. Preferably there are two separate portions of absorber material provided, each equal in length substantially to the length of the reactor core, so that when the reactor is to be shut down, all absorber material will lie completely within the core, but operation may be achieved with only one section. The tubes 10, 10' pass through the pressure shell 1 and are sealed from the coolant fluid there. Air cooler 22 and conduits 20, 21 and 20', 21' may be provided to cool the mechanism, for example compressor discharge air may be taken through an intercooler and then through the control channels to cool the tapes and absorber.

One of the bricks 3, the tube 10, tape 11, and a suitable support mechanism are shown in Figure 2 to illustrate one mechanism with which our invention may be practiced in a reactor. An Inconel tube 10 extends axially through the brick 3 and is centered therein by means of three support rods 30, 31, 32, which are welded along the length of the tube. Thus an air or coolant passage is formed between the inner wall of brick 3 and the outside tube surface. Four rods 33–36 extend through the inside of tube 10 and form a rectangular framework together with spacers 37–40. Roller 41 is mounted to spacers 37, 39 so as to be free to turn. Tape 11 having blocks 12 riveted thereto passes over the roller and out through a slot 43 in cap 42, which cap is fastened securely, as by welding, to tube 10. The cap may also receive the connections or conduits from the cooler. Any suitable number of rollers may be provided along this rigid framework, preferably at least one at each end of the reactor. The rods should be secured inside tube 10 by keys, set screws, or the like to prevent rotation therein, yet allow the rods to be pulled out for disassembly when desired.

The carrier medium may take the form of a link belt, a metal tape, a wire, or other conventional belt type carrier media. The neutron absorbing material may preferably be a boron compound, the boron being enriched in the isotope boron-10, or may be cadmium or a cadmium compound. Use of other effective neutron absorbers will also occur to those skilled in the art. The absorbing material may be fixed or attached to the carrier in any convenient manner, such as by coating thereon, by holding intimately thereto with an adhesive material, or by mechanical fastening. Preferably, the tapes may be heavy watch spring steel or Inconel bands having metal cans containing boron carbide bricks riveted thereto.

It is further apparent that control of a reactor according to our invention may be achieved by making the reactor noncritical until a given amount of fissionable or fuel material carried by the tape or wire control mechanism is inserted therein. Then control of the reactivity may be achieved by varying the position of the fuel elements inserted in opposite ends of the reactor, in the same way as when neutron absorbing material is utilized, but in opposite sense. In such case, the cans 12, 12′ would contain not an absorber, but rather a nuclear fuel such as uranium enriched in U–235.

It may be seen that since the two active portions of the carrier media move in opposite directions when the control is actuated, acceleration forces due to flight conditions, for example, are internally balanced or cancelled. Thereby much less power is required to operate the present system than would be required to actuate the conventional control rod system where the acceleration due to gravity and due to flight attitude must be counterbalanced and overcome by the driving system alone. Moreover it is apparent that each tape serves as not one but two control systems or rods, and will provide a symmetry of control within the reactor, since motion at one end will exactly counter-balance corresponding motion at the other end of the reactor. It is further apparent that the use of control tapes carrying fuel or absorber media will provide much lighter weight construction than is associated with use of cadmium and boron rods, thus allowing still greater reduction in inertia and time lag of the control system.

It may be readily seen that more than one carrier may be placed in a single channel. If a reactor such as that of Figure 1 is used a thin liner of moderating material may be disposed in a group of evenly distributed fuel element channels. A tube of high temperature structural metal, such as Inconel, may be mounted inside each of the liners, leaving a small annular air space inside the liners. Inside each tube may be provided a plurality of ribbons or tapes carrying a neutron absorber material, held in place and guided by a graphite spider inside the tube, so that from a single drive signal, any one tape at a time in any tube may be moved in or out. For example twelve such assemblies may be disposed evenly about the reactor, each having six tapes per channel, giving a total of 72 tapes. In operation, when a control motion is desired, one tape from each assembly may be withdrawn simultaneously until the desired point is reached. If the change in reactivity is not sufficient, then a second set of tapes may be withdrawn from each assembly, etc., so that one set of tapes would be coming out, then another set, then another in sequence during the life of the reactor, providing a uniform flux during the entire life of the reactor. The tapes may be driven by pulleys which are driven by electrical motors or other conventional prime movers. The tubes may connect at opposite ends of the pressure shell to conduits supplying coolant air as described in connection with Figure 1.

The power required to operate the reactivity control devices will depend on the form of the carrier and absorber utilized, the motion of the reactor-bearing vehicle, the materials used, and the rate of change of reactivity required. In the following example, the power required to successfully operate our novel control system will be calculated for comparison with that required by more conventional control schemes, to illustrate the magnitude of the improvement which results from our system.

The motion of the reactor vehicle will be assumed to have a maximum longitudinal acceleration of 3.75 times gravity and a maximum perpendicular acceleration of 5 times gravity. The maximum rate of change of reactivity assumed will require an excess reactivity (Ke) 0.006 per second. It will further be assumed that total removal of the control devices will result in an excess reactivity Ke of .25 in a new pile, that the effect of control motion is linear over at least the center 60% of travel, and that this travel accounts for 90% of the built-in excess reactivity (Ke). A total travel of 5 feet will be further assumed, with only ⅓ of the control media operating at a given time.

Then the travel for linear effect would be 60%×5 feet or 3 feet. Ke for this travel would be 90% times .25 or .225, so that the motion required for .006 Ke would be $$\frac{3 \times .006}{.225} = .08 \text{ ft.}$$

If only ⅓ of the media operate at one time, the travel must be 3×.08 or .24 feet in one second. If half this time and distance is used for acceleration, the acceleration is $$\frac{2 \times .12}{.5^2}$$

.96 feet/sec.², giving a maximum velocity of .48 feet per second. The acceleration in space must also include the vehicle acceleration of 3.75×32.2 or 120.74 feet/sec.², making a total of 121.7 feet/sec.².

If 6 control tapes, each 1 inch wide, are arranged in each of 18 holes in coolant channels so that one tape goes in one channel and back through another, the effects of longitudinal acceleration of the vehicle on the horsepower requirements of the driving motor are eliminated. Further, it is possible to run two tapes over one driving sprocket in many cases, so that there could be 30 sprockets driving 54 loops of tape, each loop being 5 times the core length or 260 inches long. Three motors could be provided, each driving 10 sprockets and 18 tapes. For adequate neutron absorption of the strength, the tapes could be .05 inch thick, with an average density of .3 pound per cubic inch. Therefore the weight per loop=260×1×.05×.3=3.9 lbs. and 18 loops per motor would place a load of 70 pounds on each motor. If the weight of the 10 sprockets and shafting is assumed as 20 pounds per motor, the total equivalent weight per motor would be 90 pounds.

Like calculations for the motors required to drive proper control rods, either cantilever or continuously supported, show that substantially 288 pounds per motor would be required. Thus it is seen that a saving of greater than 3 times can be effected in the power handling capacity of the drive mechanism when using our novel control arrangement.

Simple calculations also show that while the force required to overcome friction during 5 g loads and move the control rods would approximate 360 pounds per motor, the corresponding force required of the tape drive motors would be 116 pounds per motor. The inertia loads of control rods of the conventional type may be calculated in the assumed example to be 1,090 pounds per motor. The forces due to the acceleration of the vehicle balance out in our novel tape drive arrangement so that the inertia load of our device is only the mass of the tapes times the acceleration of 196 feet/sec.² or 2.09 pounds per motor. Thus it is apparent that the total power needed for each of the three motors with driving rods would be 3.73 horsepower, while for driving tapes, a horsepower of .103 is adequate. If rollers are introduced at one end or face of the reactor, the friction load will be greatly reduced, so that only .078 horsepower per motor will be required. Thus it is evident that a tremendous, vitally important reduction in horsepower in the order of 30 times may be effected in the control system over that required with cantilever rods, and of the order of 10 over that for continuously supported rods.

Having described our invention, we claim:

1. In a nuclear reactor provided with parallel passageways therethrough, a continuous-loop control tape extending through said passageways and opposite reactor faces, means for supporting said tape mounted exterior to said opposite reactor faces, and a nuclear reactor poison having a relatively high thermal neutron cross-section carried by said tape in two separate, corresponding sections being so positioned that movement of said tape moves said reactor poison into or out of said reactor in substantially equal amounts on opposite sides, a single drive motor, and means coupling said motor to said tape to drive said two sections simultaneously in opposite directions to control said reactor by changing the neutron density therein.

2. In a nuclear reactor provided with parallel passageways therethrough, an improved control system comprising a continuous-loop carrier extending through at least one of said passageways, respective support means for said carrier mounted exterior to said reactor and on opposite sides thereof, selected amounts of a neutron flux modifying agent mounted on said carrier in first and second discrete, oppositely disposed portions, and a single drive motor connected to move said first and second portions simultaneously in opposite directions responsive to a control signal derived from the neutron flux intensity in said reactor, said movement inserting or withdrawing said portions to alter said flux from both sides.

3. A method of controlling a nuclear reactor which comprises passing a continuous-loop carrier medium through said reactor and out opposite faces thereof, said medium carrying two oppositely-disposed discrete portions of a neutron flux modifying agent, driving said medium in a first direction to simultaneously insert said portions into said reactor at the same rate, and driving said medium in a second direction to simultaneously withdraw said portions from said reactor at the same rate to substantially preserve a symmetric flux distribution across said reactor.

References Cited in the file of this patent

UNITED STATES PATENTS

| 1,624,763 | Ryding et al. | Apr. 12, 1927 |
| 2,708,656 | Fermi et al. | May 17, 1955 |
| 2,768,134 | Fermi et al. | Oct. 23, 1956 |
| 2,856,336 | Metcalf | Oct. 14, 1958 |

FOREIGN PATENTS

| 233,011 | Switzerland | June 30, 1944 |

OTHER REFERENCES

"Pile Neutron Research," by D. J. Hughes (1953), pp. 201–204, Addison Wesley Publ. Co., Cambridge 42, Mass.